United States Patent [19]
Dvorak

[11] Patent Number: 4,712,151
[45] Date of Patent: Dec. 8, 1987

[54] SYSTEM FOR DETECTION OF GROUND FAULTS IN CIRCUIT BREAKERS

[75] Inventor: Robert F. Dvorak, Mount Vernon, Iowa

[73] Assignee: Square D Company, Palatine, Ill.

[21] Appl. No.: 720,195

[22] Filed: Apr. 5, 1985

[51] Int. Cl.$^4$ .............................................. H02H 3/16
[52] U.S. Cl. ........................................ 361/47; 361/45
[58] Field of Search ................................ 361/42, 44–50, 361/94, 96, 93, 102

[56] References Cited

U.S. PATENT DOCUMENTS

| | | | |
|---|---|---|---|
| 2,296,109 | 9/1942 | Light | 361/47 X |
| 2,363,895 | 11/1944 | Neher | 361/44 |
| 3,273,017 | 9/1966 | Mathews | 361/47 |
| 3,657,604 | 4/1972 | Willard | 361/45 |
| 3,660,722 | 5/1972 | Wilson et al. | 361/42 |
| 3,949,272 | 4/1976 | Smith | 361/42 |
| 4,089,031 | 5/1978 | Stevens | 361/50 |
| 4,110,808 | 8/1978 | Hobson, Jr. et al. | 361/44 |
| 4,115,829 | 9/1978 | Howell | 361/42 |
| 4,121,269 | 10/1978 | Hobson, Jr. | 361/47 X |
| 4,159,499 | 6/1979 | Bereskin | 361/45 X |
| 4,258,403 | 3/1981 | Shimp | 361/42 |
| 4,316,229 | 2/1982 | Helwig, Jr. | 361/44 X |
| 4,380,785 | 4/1983 | Demeyer et al. | 361/44 X |
| 4,631,622 | 12/1986 | Howell | 361/45 |

Primary Examiner—J. R. Scott
Assistant Examiner—A. Jonathan Wysocki
Attorney, Agent, or Firm—Richard T. Guttman; Larry I. Golden; Mary R. Jankousky

[57] ABSTRACT

A system for detecting ground faults in circuit breakers having electronic trip units tied together by a low impedance common or circuit ground conductor. A complete electrical path between two circuit breakers is created when the secondary winding of the instrument current transformer of each circuit breaker is grounded as required by National Electrical Code rules. This can cause the ground fault sensing apparatus to inaccurately reflect the ground fault levels of the circuit breakers. The summing transformer of this invention includes a first primary winding which sums the currents through each of the phase current transformers and a second primary winding which indicates the current through the neutral conductor. The second primary is grounded, the ground does not provide a return path for the current between the two breakers since the second primary is isolated from the other summing transformer windings which are electrically connected to the circuit breaker.

11 Claims, 3 Drawing Figures

SYSTEM FOR DETECTION OF GROUND FAULTS IN CIRCUIT BREAKERS

This invention relates to electric circuit breakers and is more particularly directed to circuit breakers having ground fault sensing capability.

BACKGROUND OF THE INVENTION

Electronic trip circuit breakers are often interconnected with control circuitry to coordinate the timing of their opening. Control circuitry having a low impedance common or circuit ground conductor creates a partial electrical path between the two circuit breakers. The National Electrical Code (NEC) requires grounding of the secondary windings of instrument current transformers, such as those employed on the neutral conductor of circuit breakers with integral ground fault protection. These grounded current transformers can complete the current paths between the two breakers and cause an objectionable flow of current from one trip unit to the other. If a first circuit breaker sees a ground fault, the combination of two circuit breakers having grounded current transformers and trip units tied together by a low impedance common conductor can cause the ground fault signal to flow between the first breaker and the second breaker. The first breaker will see a ground fault that is lower than the actual fault while the second breaker will sense a ground fault when none exists. It is necessary to prevent this flow of current between the two breakers so that ground fault conditions will be accurately sensed.

In previous designs, the secondary windings of the phase current transformers and neutral current transformers were isolated from the trip unit circuitry by secondary current transformers, which were used to increase the effective current transformer ratio. In designs where a moderate current transformer ratio is acceptable, secondary current transformers are an unnecessary expense and are not utilized. In these designs another method of stopping the objectionable flow of current must be devised. One design uses optocoupler in the control circuits which isolate the control circuits of different circuit breakers. Another method of isolating the ground fault signals is described herein.

SUMMARY OF THE INVENTION

The preferred embodiment of the subject invention is described herein as applied to an electronic circuit breaker having integral ground fault protection capabilities. The preferred embodiment utilizes a ground fault summing transformer having two primary windings and one secondary winding. The first primary winding sums the current through the current transformer of each phase conductor of the breaker. The second primary winding is connected to circuit ground as required by the NEC and is electrically connected only to the neutral current transformer monitoring the current in the neutral conductor. The second primary winding is isolated from the rest of the control circuit. When the sum of the currents through the two primary windings is not equal to zero, a ground fault condition exists and a current is induced in the secondary winding to activate the ground fault sensing circuit. By electrically isolating the return path through the grounded secondary winding, the preferred embodiment prevents the ground fault signal from traveling between two circuit breakers connected by control wiring.

DESCRIPTION OF THE PREFERRED EMBODIMENT

Figure 1:
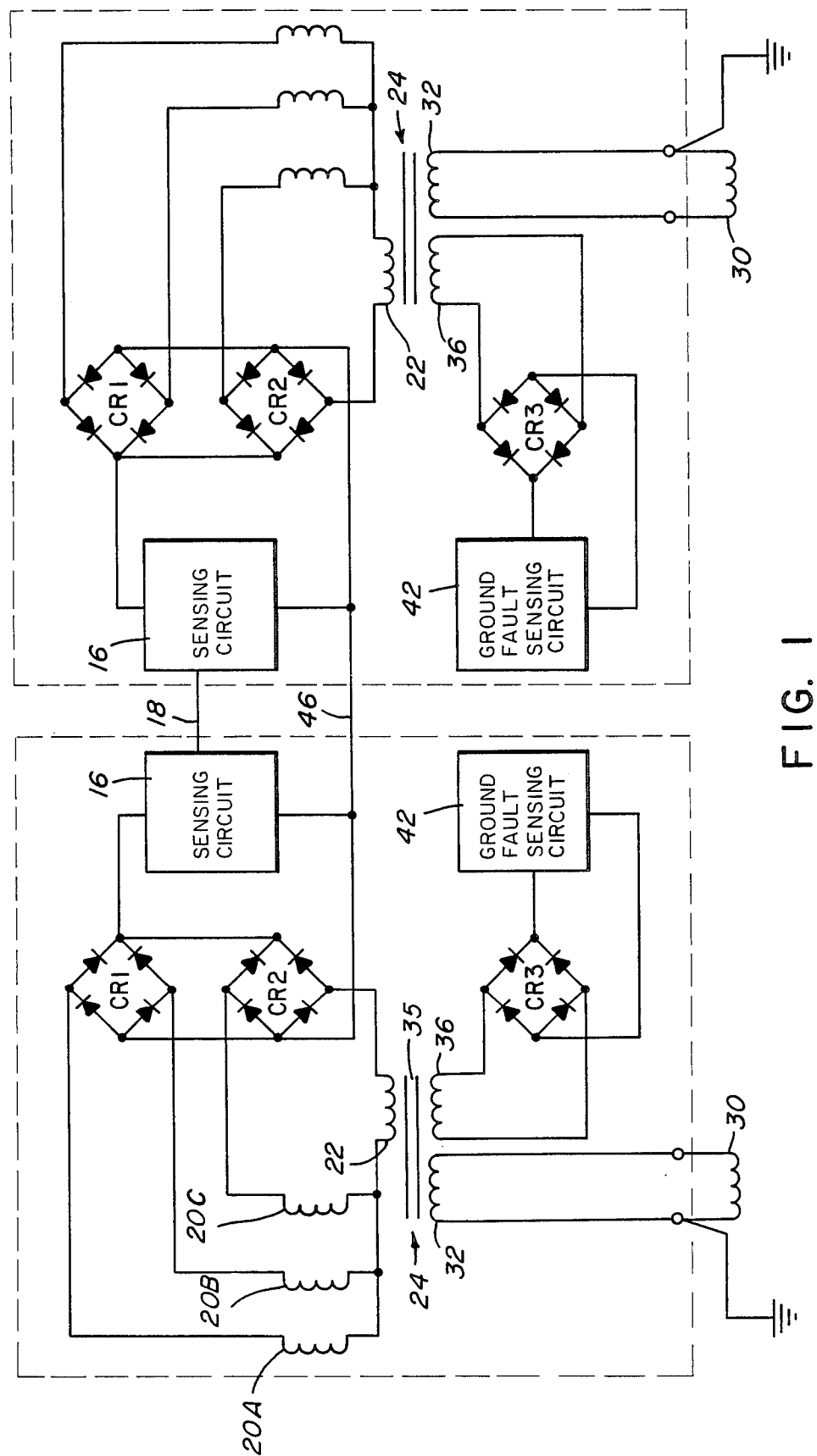
FIG. 1 is an electrical schematic depicting two circuit breakers utilizing the preferred embodiment of the present invention.
Figure 3:
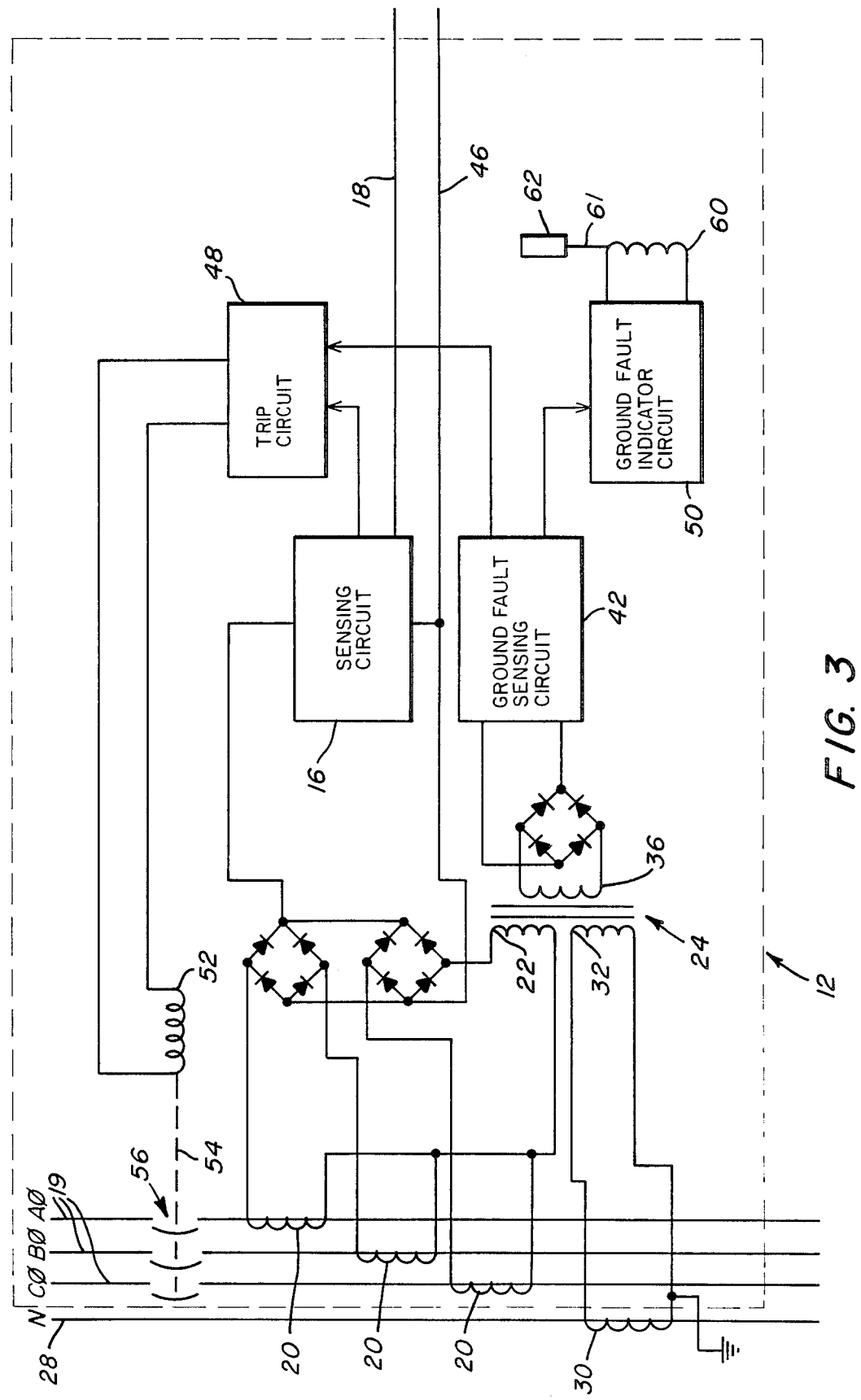
FIG. 3 is an electrical schematic of one circuit breaker embodying the present invention, including phase conductors, trip circuit and ground fault indicator circuit.

Referring now to the figures, and in particular to FIGS. 1 and 3, the improved system for detecting a ground fault is shown in schematic form. The preferred embodiment shown is applied to an electronic trip circuit breaker similar to the type described in U.S. Pat. Nos. 4,208,689 and 4,208,690, both entitled "Circuit Breaker having an Electronic Fault Sensing and Trip Initiating Unit", issued to J. W. Dickens et.al. on June 17, 1980 and to J. P. McGinnis et.al. on June 17, 1980, respectively. Both patents are incorporated by reference as if set forth fully herein. The sensing circuits 16 of two electronic circuit breakers, circuit breaker 12 and circuit breaker 14, are tied together by a control wire 18 and common or circuit ground wire 46 to time the opening of upstream and downstream breakers. Only that portion of the sensing circuit pertaining to the present invention is discussed here.

A phase current transformer 20A, 20B or 20C is associated with each respective phase conductor 19 and provides a signal proportional to the current through that phase conductor. One side of each current transformer 20A, 20B and 20C is connected to the first primary winding 22 of the ground fault sensing transformer, indicated generally as numeral 24. The other side of the first primary winding 22 is connected to the input of a bridge CR2, the other input of which is supplied by the second side of current transformer 20C. The second respective sides of current transformers 20A and 20B are connected to the inputs of bridge CR1.

The current in the neutral conductor 28 is monitored by a neutral current transformer 30. The neutral conductor 28 bypasses the circuit breaker and does not have overcurrent protection. The neutral current transformer 30 is electrically connected to the ground fault summing transformer 24 in a manner to be described later. The ground fault summing transformer 24 sums the currents through the phase current transformers 20A, 20B and 20C and the neutral current transformer 30 and induces a current in the secondary winding 36 if the sum of the currents is not zero.

The secondary winding 36 of the ground fault sensing transformer 24 is connected to the inputs of bridge CR3. The outputs of bridges CR1 and CR2 are supplied to a sensing circuit 16. The outputs of bridge CR3 are connected to a ground fault sensing circuit 42. Each bridge, CR1, CR2, and CR3, and the sensing circuit 16 are also connected to common wire 46.

Referring to FIG. 3, the ground fault sensing circuit 42 sends a signal to both the trip circuit 48 and ground fault indicator circuit 50 upon the occurrence of a ground fault. The output of the trip circuit 48 is wired to a trip solenoid 52, that has a plunger 54 that controls the opening of the circuit breaker contacts, generally indicated as numeral 56. Upon the trip circuit 48 sensing an overcurrent or ground fault, the trip solenoid 52 is energized and the plunger 54 causes the contacts 56 to move to the open position. The ground fault indicator circuit 50 is connected to a ground fault indicator coil 60 that has a plunger 61 to operate an indicator button 62 on a circuit breaker panel (not shown) upon the occurrence of a ground fault, as described herein.

The current through current transformers 20A, 20B and 20C is summed with the current through the neutral current transformer 30 by the ground fault summing transformer 24. If the sum of the currents through the current transformers is not equal to zero, a ground fault condition exists and current is induced in the secondary winding 36 of the ground fault summing transformer 24, sending a signal to the ground fault sensing circuit 42. If the signal is of a greater than a predetermined magnitude and time period, the ground fault sensing circuit 42 will send a signal via the trip circuit 48 and ground fault indicator circuit 50 to energize both the trip solenoid 52 and indicator coil 60, opening the breaker contacts and popping the indicator button 62. The ground fault sensing circuit 42 may also be designed to only pop the indicator button 62 without activating the trip solenoid 52, or vice versa.

Figure 2:
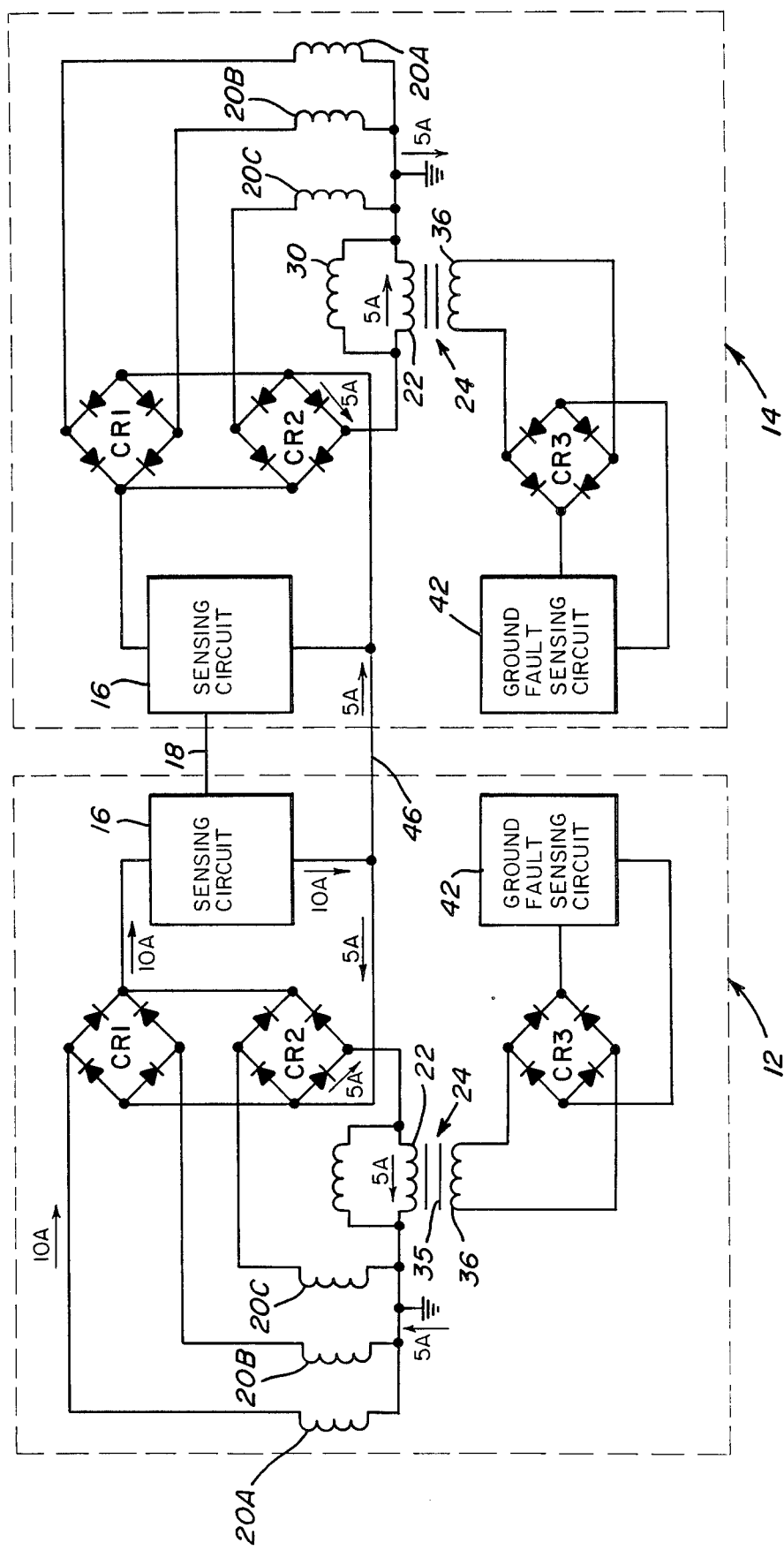
FIG. 2 is an electrical schematic of two prior art electronic circuit breakers.

In the prior art circuit breakers, as shown in FIG. 2, the neutral current transformer 30 is electrically connected across the primary winding 22. The National Electrical Code (NEC) requires that the secondary windings of the neutral current transformers be grounded. The circuit of FIG. 2 is grounded at primary 22 to comply with the NEC rules. The arrows of FIG. 2 indicate an occurrence of a ground fault in circuit breaker 12 resulting in a 10 ampere ground fault signal through the current transformer 20 of pole A. Because the circuit breakers 12 and 14 are tied by a common or circuit ground wire 46 and the neutral current transformers are grounded, the ground fault signal has a complete electrical ground loop path between the breakers. A portion of the ground fault signal, arbitrarily 5 amperes is used here, flows from circuit breaker 12 through common wire 46 to the circuit breaker 14 and returns to circuit breaker 12 via the ground. The ground fault signal passes through the summing transformers 24 of both circuit breakers, indicating an erroneously low ground fault for circuit breaker 12 and a ground fault in circuit breaker 14 where none actually exists.

The preferred embodiment of the subject invention, shown in FIG. 1, eliminates this signal error by removing the complete electrical path between the circuit breakers. The neutral current transformer 30 is electrically connected across a secondary primary winding 32. Both the first and second primary windings, 22 and 32 respectively, are positioned adjacent a core 35 to induce a resultant current in the secondary winding 36. When a ground fault exists a current is induced in the secondary winding 36 proportional to the sum of the currents through the primary winding 22 and primary winding 32. The two primary windings 22 and 32 have the same number of turns in the preferred embodiment. When no ground fault exists, the sum of the currents through the primary windings 22 and 32 equals zero, so no current flows in the secondary winding 36.

The neutral current transformers 30 are grounded as required by NEC rules, but are isolated from the remainder of the control circuit by the summing transformer 24. Thus the ground fault control signal has no complete path between circuit breakers 12 and 14 and accurately reflects the existence of ground faults in both breakers. The circuitry described above may be adapted for use with any number of configurations of ground fault sensing circuits and trip circuits.

While the invention has particularly been shown and described with reference to a preferred embodiment, it will be understood by those skilled in the art that variations in form, construction and arrangements may be made therein without departing from the spirit and scope of the invention. All such variations are intended to be covered in the appended claims.

I claim:

1. An electric circuit breaker connected to an electrical system having three phase conductors and a neutral conductor, said circuit breaker giving an indication upon the occurrence of a ground fault, said circuit breaker comprising:

a first terminal connected to each of the phase conductors;

a second terminal connected to each of the phase conductors;

a current path between each respective pair of said first terminals and said second terminals, each of said current paths including a pair of separable contacts;

three phase current transformers, each separately magnetically coupled to one of said phase conductors, each said phase current transformer having a secondary winding producing a current proportional to the current through its related phase conductor;

a neutral current transformer magnetically coupled to the neutral conductor, the neutral current transformer having a secondary winding producing a current proportional to the current through the neutral conductor, said neutral current transformer secondary winding beng electrically connected to circuit ground, and said secondary winding of said neutral current transformer being electrically isolated from the secondary windings of said phase current transformers; and a ground fault summing transformer having a first primary winding and a second primary winding electrically isolated from one another, the sum of the currents produced by the phase current transformers being applied to said first primary winding by connecting the secondary windings of said phase current transformers to said first primary winding, and the current produced by the neutral current transformer being applied only to said second primary winding, said summing transformer having a secondary winding producing a signal indicating the occurrence of a ground fault when the sum of the currents received through said phase current transformers and said neutral current transformer does not equal zero.

2. An electric circuit breaker as claimed in claim 1 additionally comprising trip means connected to the contacts for separating the contacts upon the occurrence of a ground fault in said circuit breaker.

3. An electric circuit breaker as claimed in claim 2 additionally comprising a ground fault sensing circuit connected to the output of said summing transformer and to said trip means to cause said trip means to separate the contacts upon the receipt of a signal from said summing transformer.

4. An electric circuit breaker, connected to an electrical power conductor including three phase conductors and a neutral conductor, said circuit breaker comprising:

three pairs of separable contacts;

three phase current transformers, each phase current transformer having a separate secondary winding producing a current proportional to the current through one of the phase conductors;

a grounded neutral current transformer having a secondary winding producing a current proportional to the current through the neutral conductor, said secondary winding of said neutral current transformer being electrically isolated from said phase current transformers and being connected to electrical circuit ground; and summing means having a first input and a second input, the summation of the currents produced by the secondary windings of said phase current transformers being applied to the first input, the current produced by said secondary winding of said neutral current transformer being applied to said second input, said summing means also having an output producing a signal when the sum of the currents received through said phase current transformers and said neutral current transformer is not equal to zero.

5. An electric circuit breaker as claimed in claim 4 additionally comprising:

trip means connected to said contacts to open said contacts upon said trip means being activated; and a ground fault sensing circuit connected to the output of said summing means and to said trip means, said ground fault sensing circuit activating said trip means upon receiving a signal from said summing means.

6. A circuit breaker as claimed in claim 4, wherein said summing means comprises a summing transformer including a first primary coil electrically connected to all phase current transformers.

7. A circuit breaker as claimed in claim 6 wherein said summing transformer additionally comprises a second primary coil electrically connected to said neutral current transformer.

8. A circuit breaker as claimed in claim 7 wherein said second primary coil is electrically isolated from said phase current transformers and said trip means.

9. A circuit breaker as claimed in claim 7 additionally comprising:

trip means connected to said contacts upon said trip means being activated;

a ground fault sensing circuit connected to the output of said summing transformer and to said trip means, said ground fault sensing circuit activating said trip means upon receiving a signal from said summing transformer; and control means connected to a control means of a second circuit breaker having trip means for coordinating the operation of the two circuit breakers.

10. A circuit breaker as claimed in claim 9 wherein said second primary coil is electrically isolated from said control means.

11. An electric circuit breaker having a ground fault sensing capability, said circuit breaker having a signal lead and a common circuit ground lead adapted to be connected to like leads of at least another circuit breaker for coordinating the operation of the circuit breakers, said electric circuit breaker being adapted to be connected to an electrical system having at least one phase conductor and a neutral conductor, said electric circuit breaker comprising:

at least one phase current transformer adapted to be magnetically coupled to said at least one phase conductor and having a secondary winding producing a current proportional to the current passing through said at least one phase conductor;

a neutral current transformer adapted to be magnetically coupled to the neutral conductor, the neutral current transformer having a secondary winding producing a current porportional to the current through the neutral conductor, said neutral current transformer secondary winding being electrically connected to circuit ground, and said secondary winding of said neutral current transformer being electrically isolated from the secondary windings of said phase current transformer; and summing means having a first input, a second input and an output, the current produced by the secondary winding of the at least one phase current transformer being applied to the first input and the current produced by the secondary winding of the neutral current transformer being applied to the second input, said summing means for producing at said output a signal when the sum of the currents received through said at least one phase current transformer and said neutral current transformer do not equal zero.

* * * * *